Nov. 10, 1970

J. F. GIFFORD 3,539,847

NUTATING STEP MOTOR FOR AC OR PULSE OPERATION

Filed Oct. 18, 1968

INVENTOR.
JOHN F. GIFFORD

BY

ATTORNEYS

Nov. 10, 1970     J. F. GIFFORD     3,539,847

NUTATING STEP MOTOR FOR AC OR PULSE OPERATION

Filed Oct. 18, 1968     7 Sheets-Sheet 4

| STAGE | TOROID A (28) | TOROID B (26) | COIL POWER | ACTION | CAUSE OF ACTION |
|---|---|---|---|---|---|
| 12 | | | NONE | HOLDING | A1-B1 IN CONTACT THRU DISK<br>A2-B2 IN CONTACT THRU DISK<br>CLOSED COUPLE AROUND LOOP<br>A1-B1-B2-A2-A1<br>◉ ARE PERMANENT MAGNET N POLES |
| 1 | | | B1 = N<br>B3 = S | START FIRST STEP | B1 REPELS A1<br>B3 ATTRACTS A3<br>◉ - ELECTROMAGNET N POLE<br>◎ - ELECTROMAGNET S POLE |
| 2 | | | B1 = N<br>B3 = S | STEPPING | SAME AS ABOVE |
| 3 | | | NONE | HOLDING END OF FIRST STEP | B2-B3-A3-A2-B2<br>CLOSED COUPLE |
| 4 | | | A2 = N<br>A4 = S | START SECOND STEP | A2 REPELS B2<br>A4 ATTRACTS B4 |
| 5 | | | A2 = N<br>A4 = S | STEPPING | SAME AS ABOVE |
| 6 | | | NONE | HOLDING END OF SECOND STEP | A3-B3-B4-A4-B3<br>CLOSED COUPLE |
| 7 | | | B1 = S<br>B3 = N | START THIRD STEP | B3 REPELS A3<br>B1 ATTRACTS A1 |
| 8 OMITTED | | | | | |
| 9 | | | NONE | HOLDING END OF THIRD STEP | B4-B1-A1-A4-B4<br>CLOSED COUPLE |
| 10 | | | A2 = S<br>A4 = N | START FOURTH STEP | A4 REPELS B4<br>A2 ATTRACTS B2 |
| 11 OMITTED | | | | | |

Fig. 6.

INVENTOR.
JOHN F. GIFFORD

BY Christensen, Sanborn & Matthews

ATTORNEYS

INVENTOR.
JOHN F. GIFFORD

BY Christensen, Sanborn & Matthews

ATTORNEYS

Nov. 10, 1970 J. F. GIFFORD 3,539,847
NUTATING STEP MOTOR FOR AC OR PULSE OPERATION
Filed Oct. 18, 1968 7 Sheets-Sheet 7

INVENTOR.
JOHN F. GIFFORD
BY
Christensen, Sanborn & Matthews
ATTORNEYS

United States Patent Office 3,539,847
Patented Nov. 10, 1970

3,539,847
NUTATING STEP MOTOR FOR AC
OR PULSE OPERATION
John F. Gifford, P.O. Box 117,
Corrales, N. Mex. 87048
Filed Oct. 18, 1968, Ser. No. 768,621
Int. Cl. H02k 37/00
U.S. Cl. 310—49                                    16 Claims

ABSTRACT OF THE DISCLOSURE

A nutation type motor is disclosed with its rotor clampingly engaged between nutative stators, in rolling contact with opposing stators. Each stator has two or more circumferentially spaced permanent magnet poles and two or more intervening electromagnet poles addressed to poles on the opposing stator. The permanent magnets and cooperable permeable poles of the electromagnets cooperate to "lock" the rotor and stators in any of selected indexing or stepping positions with energization removed from the electromagnets. Impulse energization in selected sequence and polarity of the electromagnets of the respective stators produces stepwise nutation thereof, hence stepwise rotor motion, in one direction or the other. With AC energization of the stator electromagnets synchronous motor operation is achieved. Polyphase and related split-phase versions of the invention are also disclosed, as is a servo loop application, and alternative energizing control circuits achieving modified modes of operation of the motor embodiments.

DESCRIPTION

This invention relates to an improved nutation motor of the type wherein nutative stators grip the rotor between them. The invention is herein illustratively described by reference to presently preferred embodiments thereof; however, it will be recognized that certain modifications and changes therein with respect to details may be made without departing from the essential features involved.

An object hereof is to provide a relatively high-torque nutation motor adapted for D.C. pulse-operated stepping operation or snychronous A.C.-operation, and directionaly reversible in either mode. A related object hereof is to provide such motors for operation either on single-phase or polyphase alternating current.

A further object hereof is to provide both high-torque load-holding and high-torque load-driving capabilities in such nutation motors and to provide definite indexed stopping points at which the motor will hold its load stationary without application of electrical energy to the motor windings, hence without heating of the motor.

A further object hereof is to provide an improved nutation motor of relatively high efficiency and which has special characteristics depending upon specific design adapting it for operation in any of a number of different modes.

Related objects include fulfillment of the above-stated purposes without need for commutators, brushes or other internal switching elements, and which therefore permits safe operation of the motor in explosive atmospheres or under conditions wherein electromagnetic radiation is to be minimized.

In accordance with this invention as herein disclosed two toroidal stators of magnetically permeable material are mounted to roll against respectively opposite faces of an intervening rotor, one such stator being adapted to nutate with respect to the other, or each stator with respect to the other stator. At least one and preferably both toroidal stators have circumferentialy spaced salient electromagnet poles projecting from one side thereof into rolling contact with the rotor, with the stators angularly indexed relatively so that the electromagnet poles on one are staggered in relation to the similar poles on the other. Similarly projecting poles of permanent magnets incorporated in each stator are positioned intermediate in electromagnet poles thereof such that each confronts an electromagnet pole of the opposing stator. By appropriate energization of the electromagnets the stators may be caused to nutate and thereby turn the rotor in one direction or the other and by one or more programmed steps or in progressive stepwise manner. Thus one unique feature of the present invention is that each toroidal stator employs two (or more) circumferentially spaced permanent magnets mounted on the side of the stator body so that their open poles face the other toroidal stator. A related second unique feature is the provision of permeable electromagnet poles formed as salient poles on the toroidal stator bodies at side locations situated between the permanent magnet poles, and which have associated electromagnet coils electricaly energizable so as to establish magnetizing force of either polarity in the permeable electromagnet poles, thereby to add to or subtract from the permanent magnet pole flux. Like the permanent magnet embodiments of the nutation motor referred to in my earlier patent 3,341,725 the present motor is operable to hold a load stationary without consumption of power or production of heat and may be operated in either direction of rotation a step at a time when actuated by discrete pulses of correct polarity. However, the present invention provides a motor that also may be operated on alternating current, provides a choice of several modes of operating control and requires fewer coils, fewer lead wires and fewer switching components, or none at all, depending upon the application.

As in my earlier patent No. 3,341,725 the preferred forms of this invention employ a thin rotor disc clampingly griped betwen relatively nutative stators.

These and other objects, features and advantages of the invention will become more fully evident from the following description by reference to the accompanying drawings.

FIG. 8 is a schematic wiring diagram comparable to that of FIG. 7 of the same motor modified somewhat by polarity reversal of certain permanent magnets, physical phase shift indexing of one stator relative to the other, and relative polarity reversal of one electromagnet winding of each stator so as to provide a single-phase A.C. motor effect without need for a phase-splitting energizing circuit or the like.

Referring to FIGS. 1–5, the motor therein illustrated comprises a base plate 10 and parallel end plates 12 and 14 mounted upright on the base plate in longitudinally spaced positions and braced apart by tie rods 16. Aligned central apertures in end plates 12 and 14 retain antifriction ball bearings 18 rotatively supporting the motor shaft 20. Set collars 22 on the shaft ends serve as thrust retainers for the shaft.

Figure 1:
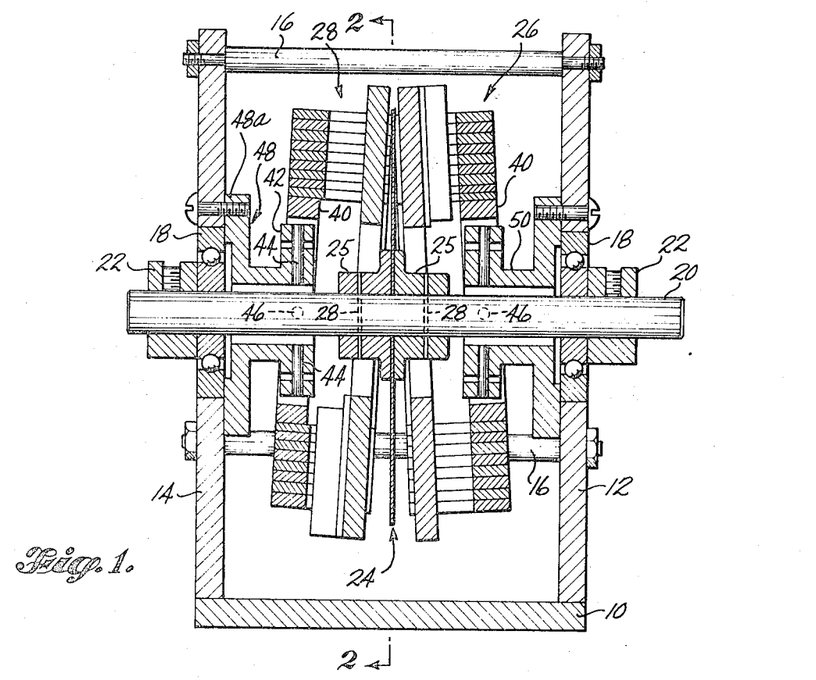
FIG. 1 is a longitudinal, sectional view of the improved motor in one embodiment, the electromagnet coils and certain mounting screws being omitted from the view for convenience in illustration.
Figure 2:
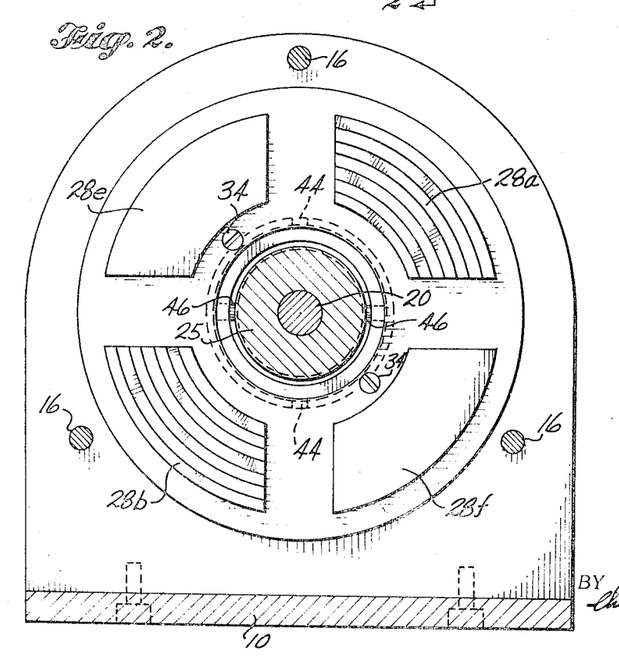
FIG. 2 is a transverse sectional view taken on line 2—2 in FIG. 1 to show the face of one nutating toroidal stator.
Figure 3:
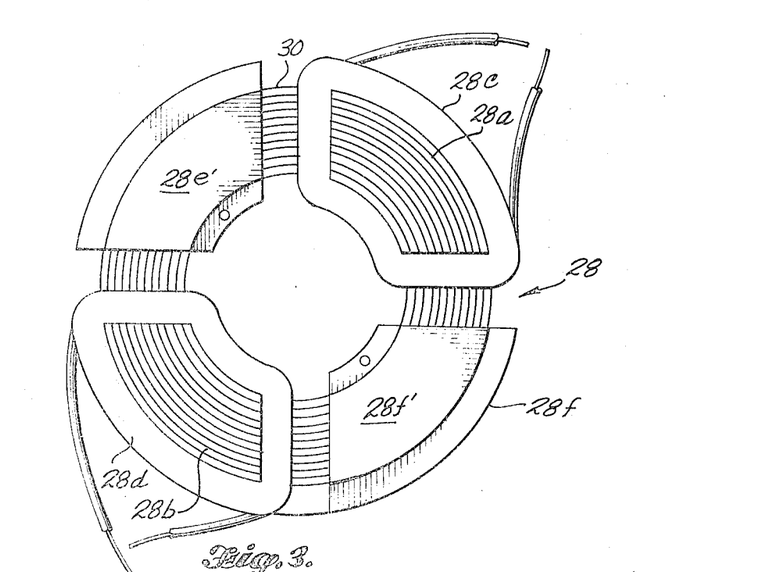
FIG. 3 is a face view of the nutating toroidal stator shown in FIG. 2 with its insulating retainer spider removed so as to expose the electromagnet coils and portions of the toroidal ring structure.
Figure 4:
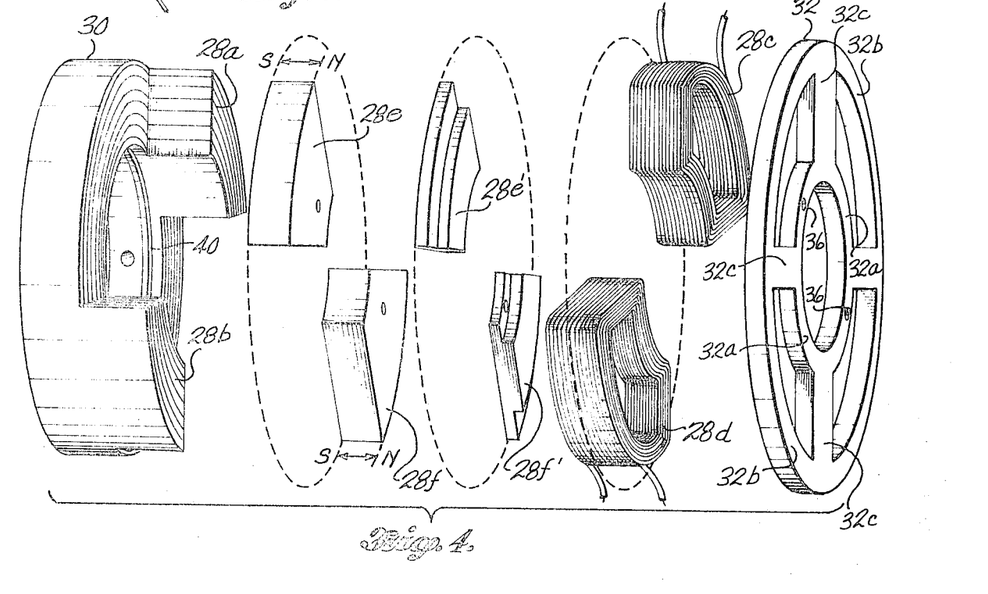
FIG. 4 is an exploded isometric view of one nutating toroidal stator.

Substantially midway between the ends of the shaft 20 a thin ferromagnetic rotor disc 24 is fixedly mounted for rotation with the shaft between the flanges of mounting collars 25 which are keyed to the shaft by means of pins 28.

In order to drive the rotor 24 nutative stators 26 and 28 (sometimes referred to as toroids A and B respectively) of generally annular form are mounted coaxially with the rotor immediately adjacent its opposite sides so as to roll simultaneously in contact with opposite faces of the rotor disc. Each stator comprises a toroidal body 30 of laminar construction. The laminae comprise an annular ring of tape-wound thin strip of ferromagnetic (magnetically permeable) material. One end of each toroidal body 30 is notched in the manner depicted in FIG. 4 so as to form two segmental diametrically disposed salient poles, designated 28a and 28b in the case of stator 28, and 26a and 26b in the case of stator 26. These magnetically permeable salient poles on each stator project endwise from the end face of the stator body toward the opposing stator. Their open or end faces are intended to roll successively against the adjacent face of rotor 24. Finally mounted on the toroidal stators 26 and 28 in positions snugly encircling the respective salient poles 26a, 26b, 28a, and 28b are field coils 26c, 26d, 28c and 28d.

Segmental permanent magnets 28e and 28f are secured to the end face of stator 28 in the respective notches thereof, that is in positions on body 30 comparable to but midway between salient poles 28a and 28b. Each magnet in this instance has its north (N) pole facing outward (i.e. endwise from the stator). Corresponding permanent magnets 26e and 26f are similarly mounted on the body of the opposing stator 26. In order to extend the projecting length of each such magnet to a surface plane flush with that defined by the pole faces of salient poles 26a, 26b, etc., each such permanent magnet mounts a pole piece of stepped thickness comprising magnetically permeable material. These bear the primed numerical designations of their respective permanent magnets. Obviously the permanent magnets may comprise permanently magnetized material or equivalent D.C. electromagnets which remain magnetized steadily during motor operation.

Superimposed as a pole piece and coil retainer on the end face of stator 28 is a nonmagnetic spider 32 of synthetic resin or other suitable material comprising inner and outer concentric rings 32a and 32b interconnected by radial arms 32c which occupy the interpole gaps. The two coils are overlapped and held by these arms as are the radially inner and outer stepped portions of pole pieces 28e' and 28f'. Appropriate mounting screws 34 passed through holes 36 in the inner ring of the spider and through registering holes in the inner steps of pole pieces 28e' and 28f' extend through registering holes in the permanent magnets and into aligned holes 38 in the end face of mounting ring 40, which are not visible in the drawing, so as to hold the assembly together. The stator 26 has a similar retainer spider arrangement.

A mounting ring 40 fixed concentrically within the stator body 30 is supported by a gimbal system of pivots to permit nutation of stator 28 in rolling contact with one face of the rotor 24. A smaller gimbal ring 42 positioned within stator ring 40 is pivotally mounted on aligned trunnions 44 and in turn pivotally supports the ring 40 on trunnions 46 aligned at right angles to the trunnions 44 in a common transverse plane therewith. The trunnions 44 are carried by a collar 48 which freely encircles the shaft 20 and which is supported by its base flange 48a bolted to end wall 14. Similar parts provide a universal mounting for stator 26 by way of a collar fitting 50 similar to the fitting 48 and likewise bolted to the end wall 12.

In the assembly of electromagnet and permanent magnet poles for the stators 26 and 28 it will be evident that the poles project slightly beyond the exposed face of the retainer spider 32 and this thereby assures direct physical contact of the pole faces with the adjacent face of the rotor so as to maximize the magnetic forces interacting on the stators, both to clamp and hold the rotor between stators at the point of rolling contact and to develop nutation torque in the stators and corresponding holding or driving torque in the rotor.

In this embodiment the two permanent magnet salient poles of each stator facing the rotor 24 are north (N) magnetic poles and the stators are relatively oriented in their stationary angular positions about the axis of shaft 20 such that for each permanent magnet pole there is across from it in registry position on the opposing stator a permeable salient pole. This appears in the schematic illustration of FIG. 5 wherein the north magnetic pole 28e of stator 28 is indicated to be in circumferential registry with the electromagnet salient core pole 26a whereas the permanent magnet pole 26e is in circumferential registry with the salient core pole 28a. Thus without energization of any electromagnet coils the two stators will nutate to or remain in corresponding positions of rolling contact pinching the rotor 24 between them at a point lying on each stator approximately midway between one of its permanent magnet poles and a permeable salient pole. Thus, with two permanent magnet poles and two electromagnet poles in a stator, there are four alternative indexing or stopping positions for the stators. These are designated $S_1$, $S_2$, $S_3$ and $S_4$. The nearest one of these will be sought by the stators through permanent magnet force effects when energizing current is removed from the electromagnet coils.

Figure 6:
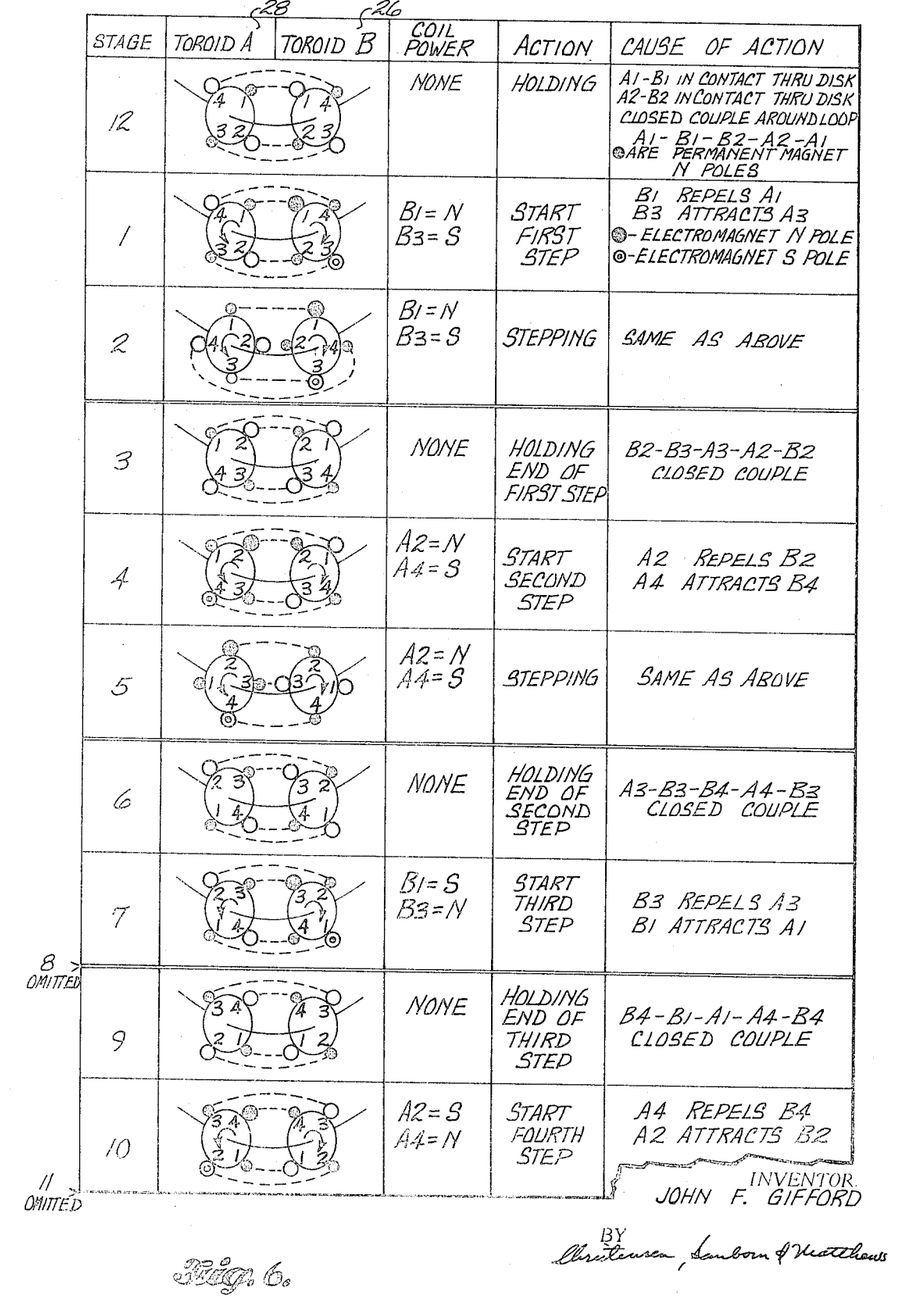
FIG. 6 is a chart with staging diagrams and notations illustrating and describing the operating steps in completing a rotation cycle of the motor operation, for example, as a step-by-step pulsed motor.

In order to drive the stators conjointly around the rotor face from any such indexing position to the next adjacent position and thereafter to succeeding positions selective energization of the electromagnet coils is involved according to a sequence conveniently depicted in FIG. 6. In this representation it is assumed that the two field coils of each stator are connected for simultaneous energization with a polarity such that each produces a salient pole polarity opposite from that of the other (as in FIG. 7, later to be described). It is also assumed that an energizing circuit is provided which permits energization, with predetermined polarity, first of the two coils of one stator simultaneously and then of the two coils of the second stator simultaneously, in alternate fashion, in order to execute progressive steps of nutation. A similiar sequence of coil energization with opposite polarity causes progressive stepwise motion of the stator in reverse.

Since the diagrams and notations in FIG. 6 are largely self-explanatory only brief comment thereon is deemed appropriate herein. In this diagram, the notation "Toroid A" refers to stator 28 (FIGS. 1-5) and the notation "Toroid B" refers to stator 26. The simplified diagrammatic representations of the stator pole arrangements in FIG. 6 occurs with the stators "opened-up" by hypothetical bending of the rotor axis as in FIG. 5. The poles of toroid A are numbered 1, 2, 3 and 4 and are separately designated $A_1$, $A_2$, $A_3$ and $A_4$. Those of toroid B are correspondingly numbered and designated. The dotted lines between opposing stator poles indicate a mating relationship.

In stage 12 of FIG. 6 all stator coils are unenergized. The stators are forcibly held stationary by permanent magnet flux looped through permanent magnet $B_2$, permeable salient pole $A_2$, permanent magnet $A_1$ and permeable salient pole $B_1$, as well as the intervening segments of toroid cores and interposed permeable rotor disc (not shown).

In stage 1, current applied to the coils of toroid B makes electromagnet $B_1$ a north pole and $B_3$ a south pole. $B_1$ and $A_1$ now repel one another and $A_2$ and $B_2$ remain mutually attractive, thus initiating motion. In the position depicted as stage 2, the stators have reached the midpoint of a step motion. At this position it will be observed that a magnetic force balance between stators is not yet fulfilled inasmuch as permanent magnet pole $A_1$ continues to repel electromagnet pole $B_1$ while permanent magnet pole $A_3$ continues to attract electromagnet pole $B_3$, thus the rolling action continues on in the same direction until reaching the position shown in stage 3. At this point, removal of energization from all electromagnets leaves residual permanent magnet flux looped serially through $B_3$, $A_3$, $A_2$ and $B_2$, which becomes effective to hold the stators in this new indexing position.

In order to move the stators another step in the same direction, the electromagnets of toroid A are now energized to produce electromagnet pole polarities as in stage 4, and the ensuing sequence is similar to that already described. The next succeeding step is effected by returning the energization to toroid B. The process may be repeated a third time with the coils of toroid A again energized in order to complete a full rotation cycle of the stators in accordance with the succeeding stages illustrated in FIG. 6. It will of course be evident from general knowledge regarding nutation motors that the rotor 24 is itself driven in rotation by the described nutative rolling action of the stators against it and that the rotor turns at an angular velocity which can be made a small fraction of the angular velocity of nutation of the stators, the ratio depending upon pitch of the nutation cones of the stators.

It will further be evident that progressive stepping action of the stators may also be accomplished with the same motor theoretically by simultaneous energization of the coils of both stators; however, the required polarity pattern for the electromagnet coils is somewhat complicated in that mode of energization inasmuch as on every other pulse or step the energization polarity for the electromagnet coils of first one stator and then of the other must be reversed.

In describing the motor's operation by reference to FIG. 6 it was assumed that the motor is operated as a pulsed stepping motor. The described motor may also be operated as a split-phase A.C. motor. In this mode, the sequence of excursion peaks of the split-phase currents supplied to the respective sets of motor windings (FIG. 7) correspond to the sequential energization pulses applied to the pulsed stepping motor version depicted in the diagram of FIG. 6. This is to say that such a motor then becomes a synchronous motor having a definite rotational position to electrical phasings.

Figure 7:
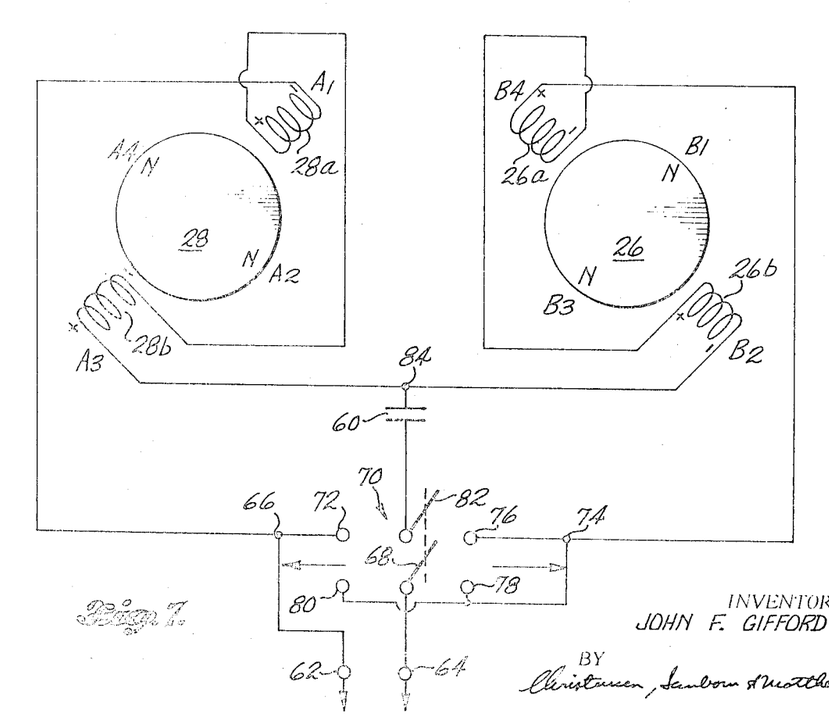
FIG. 7 is a schematic wiring diagram for the stator arrangement of FIG. 5, but with the stators shown side by side instead of superimposed in axial alignment as in the motor, but with the poles oriented on the page in true relative angular positions as could be seen from one end of the motor.

Energized from a single-phase source of alternating current, as depicted in FIG. 7, the sets of stator coils are serially connected across the source terminals and the set of coils of one toroid are shunted by a phase-shift condenser 60. In FIG. 7 the source terminals 62 and 64 are connected respectively to a reference junction 66 and one contactor 68 of a double-throw, double-pole polarity reversing switch 70. Junction 66 is connected to one stationary contact 72 of switch 70 and to the series circuit extending successively through the stator electromagnet coils 28a, 28b, 26b, and 26a to a junction 74 which is connected to the remaining three contacts 76, 78 and 80 of switch 70. Condenser 60 is connected between the second contactor 82 of switch 70 and a junction point 84 in the conductor extending between the interconnected ends of electromagnet coils 28b and 26b. As indicated in the figure, the motor is energized to rotate in one direction with switch 70 in one closed position and in the opposite direction with the switch in its alternate position.

The presence of the capacitor in shunt with the coils of one stator forces the magnetizing current in that stator to lag behind that in the other stator. Theoretically when the current in one set of stator coils is approximately 90° behind the current in the other set of stator coils, the coils themselves being oriented at 90° between the sets, the effect of a two-phase motor with a rotating magnetic field is produced. It has been found however that this motor operates very satisfactorily with an electrical phase lag between stators of much less than 90°.

With the circuit shown in FIG. 7 if all of the coils have identical resistance and reactance somewhat more current will flow in the coils which are shunted by the capacitor than in those which are not. However, the difference is not sufficient to greatly impair the efficiency of the motor.

The wiring of the schematic of FIG. 7 shows one means for reversal of motor direction, by shifting the condenser 60 from a position shunting the coils of one toroid to a position shunting the coils of the other toroid. Reversal of motor direction may be accomplished equally well by leaving the condenser shunting the coils of one toroid, and instead interchanging the polarity of the connections to the pair of coils of either toroid. This second method permits the use of toroid coils of differing resistance and reactance, to compensate for the differing coil currents due to the condenser shunt, to produce magnetic poles of equal intensity, for improved dynamic balance.

Figure 8:
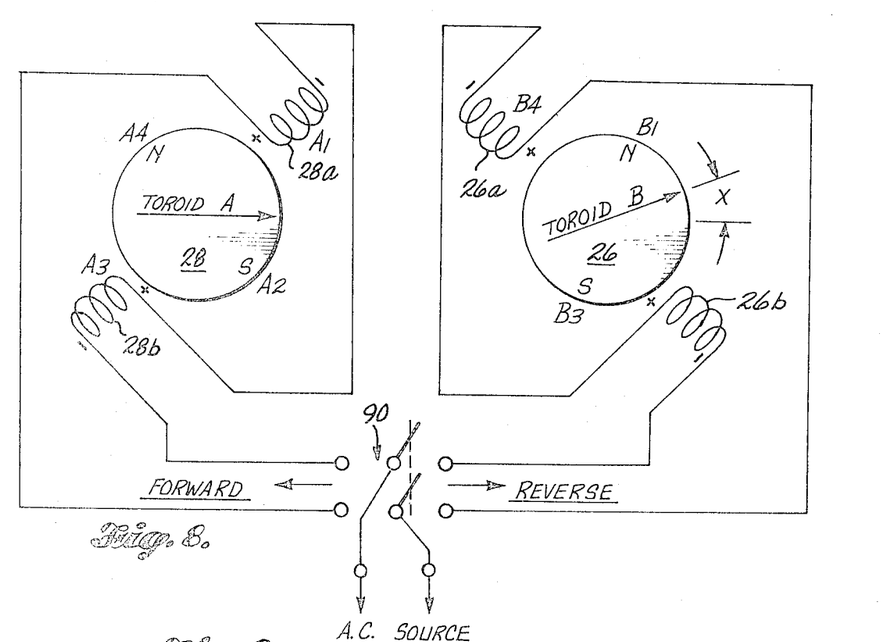

The modified embodiment shown in FIG. 8 may employ essentially the same construction as that of the motor depicted schematically in FIG. 7, except that one of the permanent magnet poles addressed to the rotor on each stator, 26 or 28, is a south pole whereas the other is a north pole, and the trunnion supports for stator 26, and thereby its poles, are shifted by an angle X in relation to the stator 28 so as to index the stators differently in a manner shifting the like permanent magnet poles more closely together. An additional difference between FIGS. 7 and 8 is the electrical connection of the sets of electromagnet field windings on each stator in FIG. 8 with like polarity instead of relatively opposite polarity; also the windings of only one stator are energized at a time. Reversal of direction in this case is achieved by energizing the windings of the other stator through operation of selector switch 90. Moreover in this configuration unless one of the stators is rotated in its angular index position a few degrees relative to the other stator the stators nutating together have only two preferred locking or holding positions employing permanent magnet couples, rather than the four preferred positions characteristic of the previously described embodiments. However, with such angular offset in the relative indexing between stators as shown (by angle X) such a motor acquires four angularly spaced stopping positions in which the permanent magnets and associated electromagnet permeable poles develop holding couples which have nearly equal holding force or preference. In essence the motor now operates substantially as a split-phase motor without the requirement for a phase shift condenser.

An interesting characteristic of the modified motor described and illustrated in connection with FIG. 8 is that while its torque capability is low in relation to that of the motor depicted in FIG. 7, for example, upon encountering a load above a certain value the motor will reverse of its own accord and will run in the opposite direction until it again encounters a load above a certain value whereupon it will again reverse. In effect, therefore, this motor has the characteristic of self-reversal in response to predetermined loading in either direction of rotation and is accordingly useful, for example, in certain reversible scanning or servo applications.

Figure 5:
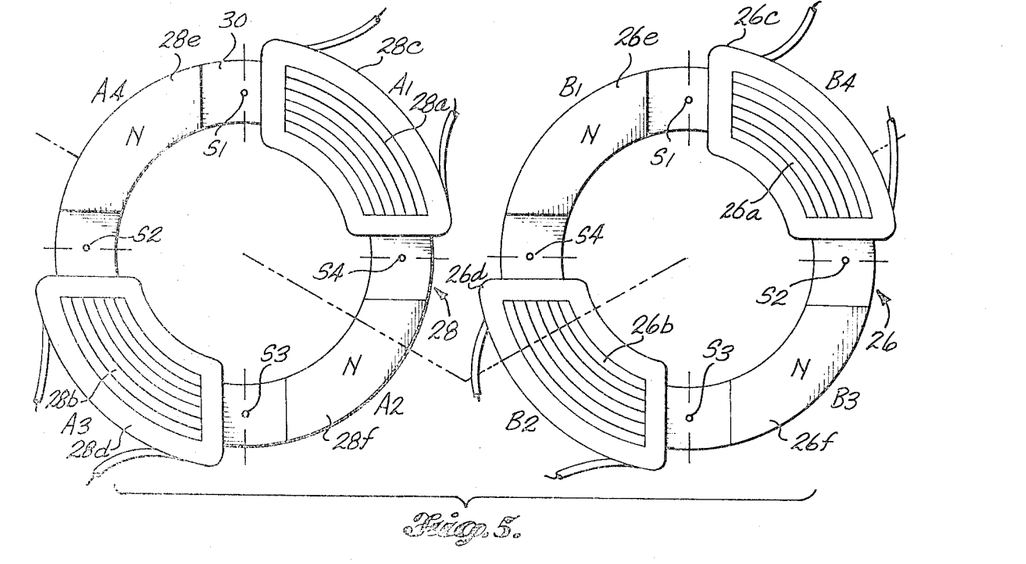
FIG. 5 is a schematic view of the two mating toroidal stators positioned as if hinged apart like the pages of a book by hypothetical bending of their common axis at a point between them, so as to show angular orientation of mating electromagnet and permanent magnet pole faces of the respective stators, together with the related permanent magnet polarities, the pole polarities and arrangements in this example being designed for pulsed D.C. or split-phase A.C. motor operation.
Figure 9:
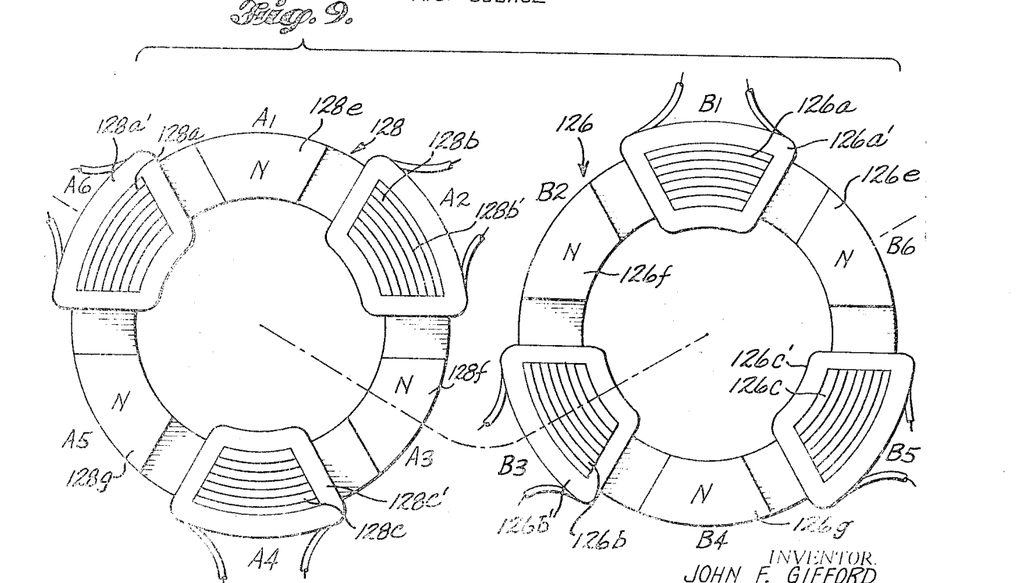
FIG. 9 is an opened-up view comparable to the view of FIG. 7 showing the two mating toroidal stators of a modified motor adapted for three-phase A.C. operation.

Following the illustrated technique used in FIG. 5 of "opening up" the opposing stators, FIG. 9 depicts the stators and their respective electromagnet and permanent magnet pole arrangements for a three-phase motor employing features of this invention. Stator 128 and stator 126 are of generally toroidal form as in the previously described embodiments and are constructed basically in the same manner as such earlier embodiments. However, instead of having two electromagnets and electromagnet permeable poles and two permanent magnets and associated pole pieces, each stator in this instance has three of each type of pole. In the case of stator 128 the electromagnet salient poles are designated 128a, 128b and 128c, distributed at 120° spacing about the working face of the stator and each surrounded by a magnetization coil bearing a corresponding numerical designation, primed. Midway between the permeable salient poles are located the three permanent magnets and associated poles, designated respectively 128e, 128f and 128g. The corresponding parts of stator 126 have reference numerals similarly arranged, the respective salient poles being designated 126a, 126b, and 126c, respectively associated field coils being designated 126a', 126b' and 126c' and the intervening permanent magnet units being designated 126e, 126f and 126g. The arrangement and relative rotational indexing of the stators places a permeable electromagnet pole in physical registry with an opposing permanent magnet pole in every instance. All permanent magnet poles presented to the intervening rotor (not shown) are of like polarity, in this case north poles. Assembly of such a motor may be similar to that shown in FIGS. 1 and 2, for example, and could be effected by simply substituting the rotor assemblies 128 and 126 for the rotor assemblies 28 and 26 in the embodiment shown in FIG. 1. In other words, the trunnion supports for the stators, the housing and shaft support, the rotor construction and positioning and other arrangements and features of the two motors, though not shown in detail in FIG. 9 can be essentially the same.

Figure 10:
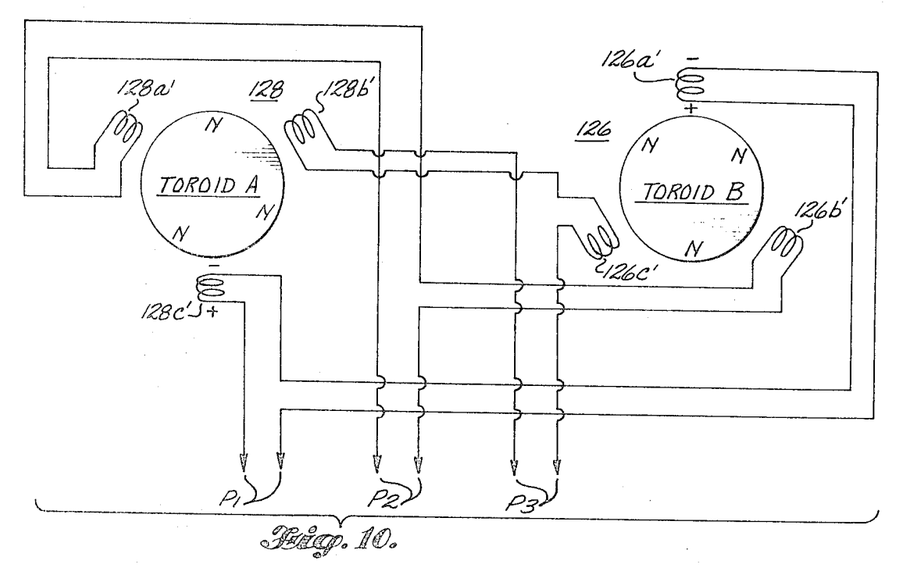
FIG. 10 is a schematic wiring diagram for operatnig the motor of FIG. 9.

FIG. 10 illustrates the schematic wiring diagram for three-phase operation of the motor shown in FIG. 9. In FIG. 10 the electromagnet and permanent magnet positions of the stators are oriented on the page in true relative angular positions as would be seen from one end of the motor, as in the case of FIG. 5. In the illustration, electromagnet 128c' is at the bottom of stator 128 and is energized serially from the terminals $P_1$ representing one phase of a three-phase source with the winding 126a' at the top of rotor 126. These two windings are connected with relatively opposite polarity, that is one produces a south magnetic pole and the other produces a north magnetic pole. Similarly connected for energization across the second phase terminals $P_2$ are the windings 128a' and 126b'. In similar manner windings 128b' and 128c' are serially connected for energization across the third phase source terminals $P_3$.

This three-phase motor system shown in FIGS. 9 and 10 has six preferred stopping or clamping positions of the two toroidal stators. As in the previous embodiments in each of these positions the two permanent magnets immediately adjacent opposite sides of the stopping point, one on each stator, cooperate to form a four-pole closed magnetic loop or couple producing a large clamping force. The toroids remain clamped in any one of the six indexing or stopping positions until the magnetic holding force of the permanent magnets is overcome and unbalanced by energization of adjacent electromagnet coils. The steps and sequence of steps occurring in the production of stepped or synchronous stepping movement of the toroids and corresponding driven rotation of the rotor are directly analogous with those illustrated and explained in connection with FIG. 6 for the two-phase or split phase embodiment.

The schematic diagram of FIG. 10 is shown for a single direction of rotation of the motor shaft. If any two of the three input power phases are interchanged, the motor shaft will rotate in the opposite direction, as in many common three-phase motors.

Figure 11:
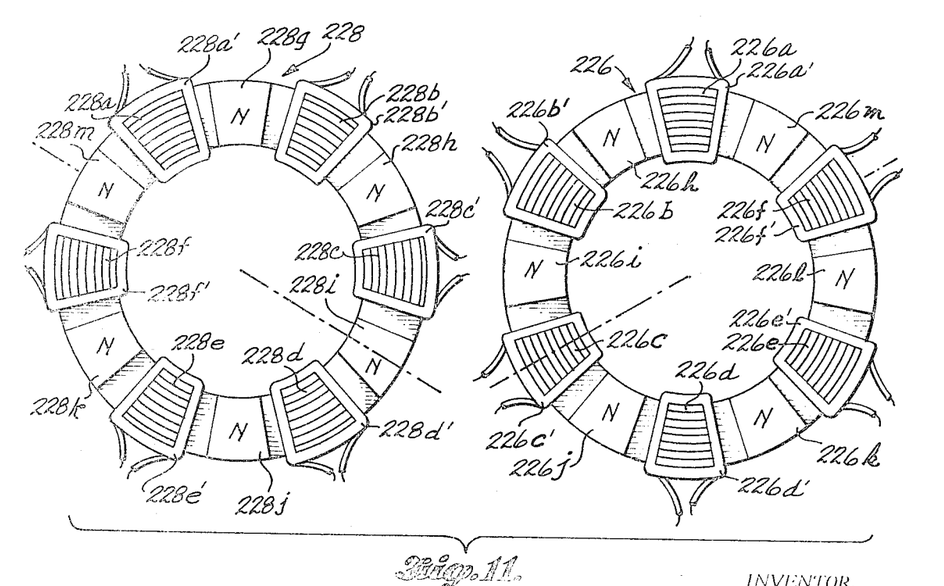
FIG. 11 is an opened-up view of the stators of a further modified motor adapted for three-phase split-phase operation.

FIG. 11 illustrates the "opened-up" stators of a split-phase three-phase motor, as an extension of the embodiment depicted in FIG. 9, the view illustrating the modified stators in the same relative position as the stators depicted in FIG. 9. In this case, as in the FIG. 9 embodiment, the stators may be constructed and formed in a manner similar to the first-described embodiments and may, in fact, be substituted in the motor for the stators shown in FIG. 1. In effect, the embodiment shown in FIG. 11 is a combination or integration of the three-phase motor concept shown in FIG. 9 with the split-phase motor concept shown in FIG. 7. An advantage of the split-phase three-phase motor is the relatively large number (twelve) of preferred stopping or indexing positions in each nutation cycle of the stators. Thus such a motor is particularly useful in applications where precise angular indexing of machinery driven by the motor is required. Also, when running continuously, the motor exhibits less "cogging" or pulsating effect than versions having fewer steps per nutation cycle.

In FIG. 11 stator 228 has six equally spaced electromagnet salient poles 228a, 228b . . . 228f and associated windings identified with similar numerals primed and, between the respective electromagnets, has six permanent magnets 228g, 228h . . . 228m. Stator 226 has a similar grouping of electromagnets and permanent magnets and these, together with the associated coils, bear reference numerals similarly related to the stator number, as with stator 228.

Figure 12:
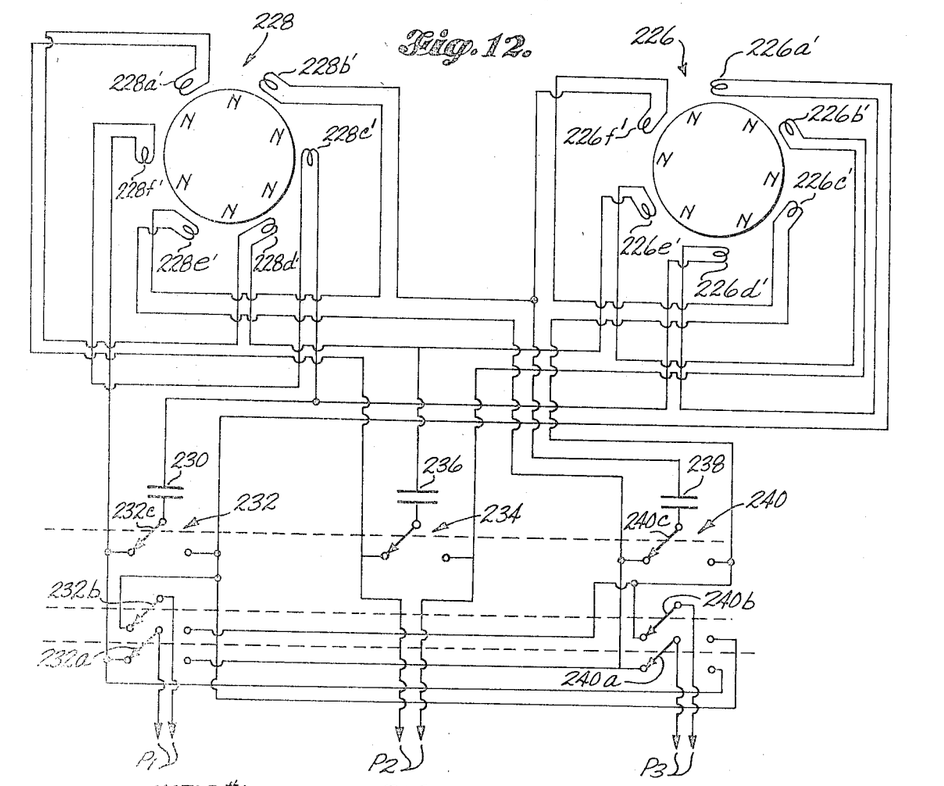
FIG. 12 is a schematic wiring diagram for operating the motor of FIG. 11.

In the schematic diagram of FIG. 12 it will be seen that coils 228f' and 228c' are serially connected with relatively opposite polarity, both shunted by condenser 230 with gang switch 232 in its illustrated position. These two coils are serially connected with coils 226d' and 226a', the latter two with relatively opposite polarity, across the terminals $P_1$ of the first phase of a three-phase source. The series circuit comprprising the two sets of coils is completed through the switch arms 232a and 232b in the same position of the switch in which the third arm 232c connects the condenser 230 across coils 228f' and 228c' in series. Similarly, with switch 234 in its illustrated position, electromagnet coils 228a' and 228d', in series, are shunted by condenser 236 and are serially connected with coils 226e' and 226b', all across terminals $P_2$ for the second phase of the three-phase A.C. source. In like manner arm 240c of switch 240 connects condenser 238 in shunt across the series combination of coils 228b' and 228e' whereas switch arms 240a and 240b complete a series circuit of coils 228b', 228e', 226f' and 226c' across terminals $P_3$ for the third phase of the three-phase source. The phase shifting function of each of condensers 230, 236 and 238 is similar to that of condenser 60 in FIG. 7. Reversal of the position of switches 232, 234 and 240 causes reversal in the direction of rotation of the motor. It will be noticed that in order to reverse the motor it is necessary both to interchange two of the three phases and to shift the capacitors from connections shunting two of the four series-energized electromagnet windings to a position shunting the other two of the four.

Figure 13:
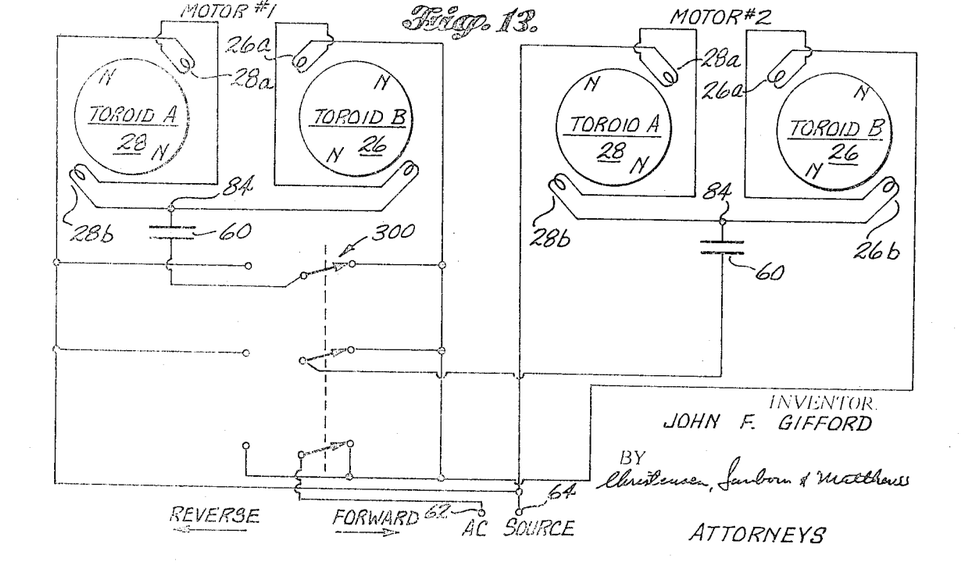
FIG. 13 is a schematic wiring diagram showing two motors connected to operate in an open-loop servo system, with each motor operated in the split-phase arrangement essentially as depicted in FIG. 7.

In FIG. 13, two split-phase motors similar to those illustrated and described in connection with FIGS. 1–7 are connected for energization across the same source terminals 62 and 64 for operation in an open-loop servo system. This type of interconnection of two or more stepping motors of this invention is especially useful in the case of twin-nutating stator motors characterized by a high torque-to-inertia ratio permitting the motors to lock in or synchronize precisely with the cycle of the power source while carrying relatively heavy loads. Due to the use of permanent magnets in the stators as disclosed the motors are synchronous with the recurring power cycles and therefore, of course, with each other. The circuit illustrated in FIG. 13 is extremely useful in the case of small motors designed to drive small or lightly loaded shafts such as electronics control dials and other instrument shafts at remote locations.

As will be noted in FIG. 13, switch 300 comprises three arms and three sets of contacts. The upper set of contacts cooperates with motor number one and the middle arm cooperates with motor number two in the same manner as the upper arm 82 of switch 70 in FIG. 7 cooperates with the motor shown in that figure. The lower arm of switch 300 cooperates with both motors in the same manner as the lower arm 68 of switch 70 in FIG. 7.

Similarly, the three-phase and split-phase three-phase motors of FIGS. 8–9 and of FIGS. 10–11 may be interconnected for synchronous operation from a common control-switch assembly.

The permanent magnets used in these mtors may be of either metal or ceramic types. However ceramics such as ferrites are preferred because as nonconductors they do not generate back EMF fields, and because of their high coercive force and resistance to demagnetizing fields.

These and other aspects, applications and modifications of the invention will be evident to those skilled in the art having reference to the foregoing disclosure of the presently preferred embodiments thereof.

What is claimed is:

1. A nutation motor comprising a generally annular rotor, means supporting the rotor for rotation about an axis, a pair of generally annular stators positioned immediately adjacent respectively opposite sides of the rotor in coaxial relationship therewith, means supporting at least one stator for nutative rolling engagement with the rotor about the latter's rotation axis while constraining said nutative stator against rotating with the rotor, permanent magnets carried by the stators with external pole faces confronting the rotor and distributed in a circle about said axis, with the permanent magnets of one stator being offset circumferentially from the permanent magnets of the other stator, electromagnets carried by the stators with magnetically permeable poles having external pole faces also confronting the rotor and distributed in said circles at respective locations intermediate the permanent magnet pole faces of the associated stators, whereby the nutative stator is normally attracted to the opposing stator and thereby into engagement with the rotor at any of a plurality of indexing positions by permanent magnet flux traversing cooperating pole faces of the two stators, and means to energize the electromagnets in selected order so as to introduce electromagnet flux through an electromagnet pole face of one stator and the opposing permanent magnet pole face of the other stator at any of successive circumferentially distributed locations offset from the normal permanent magnet holding flux establishing said indexing positions, whereby to produce nutation of said stator and corresponding rotation of said rotor to successive indexing positions.

2. The nutation motor defined in claim 1, wherein the rotor comprises a relatively thin disc and wherein both stators are mounted for nutative rolling engagement with the rotor about the latter's rotational axis.

3. The nutation motor defined in claim 2, wherein each stator comprises two permanent magnet pole faces disposed at 180° from each other and two intervening electromagnet pole faces disposed at substantially 180° from each other at locations circumferentially between the permanent magnet pole faces.

4. The nutation motor defined in claim 2, wherein each stator comprises three permanent magnet pole faces disposed at 120° from each other and three intervening electromagnet pole faces disposed at substantially 120° from each other at locations circumferentially between the permanent magnet pole faces.

5. The nutation motor defined in claim 2, wherein each stator comprises six permanent magnet pole faces disposed at 60° from each other and six intervening electromagnet pole faces disposed at substantially 60° from each other at locations circumferentially between the permanent magnet pole faces.

6. The nutation motor defined in claim 1, wherein the permanent magnet poles confronting the rotor are all of like magnetic polarity.

7. The nutation motor defined in claim 6, and control circuit means for energizing the electromagnets of each stator sequentially, in alternation with energization of the electromagnets of the other stator.

8. The nutation motor defined in claim 1, and control circuit means for energizing the electromagnets sequentially, with electromagnets on both stators simultaneously energized to cooperate in moving the rotor.

9. A nutation motor comprising a generally annular rotor, means supporting the rotor for rotation about an axis, a generally annular stator positioned adjacent one side of the rotor in co-axial relationship therewith, means supporting the stator for nutative rolling engagement with the rotor while constraining such stator against conjoint rotation with the rotor, permanent magnet means carried by the stator with external pole faces confronting the rotor at a location offset radially from said axis, electromagnet means carried by the stator with external pole faces also confronting the rotor at a location offset radially from said axis and circumferentially from the permanent magnet pole face, magnetically permeable means positioned immediately adjacent the rotor opposite from the stator and affording a bridging low-reluctance path for magnetic flux passing between any two successive pole faces of the stator, and means to energize the electromagnet means to pass magnetic flux through the electromagnet means pole faces in sequential manner.

10. The nutation motor defined in claim 9, wherein the magnetically permeable means comprises a second stator similar to the first-mentioned stator and similarly positioned in relation to the rotor on the side thereof opposite the first-mentioned stator for nutation conjointly with the first-mentioned stator and rolling engagement with the rotor.

11. The nutation motor defined in claim 10, wherein the second-mentioned stator carries permanent magnet means and electromagnet means similar to those of the first-mentioned stator, and control circuit means operable to energize the electromagnet means of the respective stators in predetermined sequential order.

12. In a synchronous type electric motor having cooperatable first and second members mounted for nutative motion of one relative to the other about a common central axis, at least one of said members having distributed in circular series arrangement around said axis a plurality of permeable magnetic elements, certain of said elements evenly distributed in the series comprising permanent magnets having respective pole faces of like polarity open toward the other member, and intervening ones of said elements comprising variably energizable electromagnets having respective pole faces open toward said other member, said other member also having a plurality of permeable magnetic elements in circular series arrangement with pole faces open toward said one member and relatively located about said axis so as to register with magnetic element pole faces of said one member, both of said members having magnetically permeable means providing flux return paths bridging between each of the successive elements in the respective series.

13. The motor defined in claim 12, wherein both members are both mounted for relative nutative motion and are restrained against rotation, and wherein the motor further comprises a disk-like rotor mounted for rotation on said axis and interposed between and in bearing contact with both of said members.

14. The motor defined in claim 13, wherein the magnetic elements of both members comprise the same number of permanent magnets with open pole faces of the same number of permanent magnets with open pole faces of the same spacing and like polarity, and the same number of intervening electromagnets, with the members rotatively oriented about said axis relatively so that the permanent magnets of each register with the electromagnets of the other.

15. The motor defined in claim 14, wherein the electromagnets have windings connected in circuit for energization of successive windings around the series by voltage impulses of opposite polarity so that as magnetic flux from a permanent magnet returning from the opposing member through the electromagnet element adjacent one side of the permanent magnet is being nullified by an impulse of one polarity through such latter electromagnet, such flux of the same permanent magnet is being diverted into and reinforced in the electromagnet element adjacent the opposite side of said permanent magnet by an impulse of relatively opposite polarity applied to the latter electromagnet, whereby to advance the members nutatively by one pole pitch distance in the motor.

16. The motor defined in claim 12, wherein the electromagnets have windings connected in circuit for energization of successive windings around the series by voltage impulses of opposite polarity so that as magnetic flux from a permanent magnet returning from the opposing member through the electromagnet element adjacent one side of the permanent magnet is being nullified by an impulse of one polarity through such latter electromagnet, said flux of the same permanent magnet is being diverted into and reinforced in the electromagnet element adjacent the opposite side of said permanent magnet by an impulse of relatively opposite polarity applied to the latter electromagnet, whereby to advance the members nutatively by one pole pitch distance in the motor.

References Cited

UNITED STATES PATENTS

| | | | |
|---|---|---|---|
| 2,275,827 | 3/1942 | Plensler | 310—82 |
| 3,262,081 | 7/1966 | Fairbanks | 310—82 |
| 3,341,725 | 9/1967 | Gifford | 310—80 |
| 3,392,293 | 7/1968 | De Boo | 310—49 |
| 3,428,839 | 2/1969 | Singleton | 310—82 |

WARREN E. RAY, Primary Examiner

R. SKUDY, Assistant Examiner

U.S. Cl. X.R.

310—82; 318—138

PO-1050
(5/69)

UNITED STATES PATENT OFFICE
CERTIFICATE OF CORRECTION

Patent No. 3,539,847      Dated November 10, 1970

Inventor(s) John F. Gifford

It is certified that error appears in the above-identified patent and that said Letters Patent are hereby corrected as shown below:

Claim 14, lines 4 and 5, should read --the same spacing and like polarity, and the".

SIGNED AND
SEALED
MAR 2 1971

(SEAL)
Attest:

Edward M. Fletcher, Jr.
Attesting Officer

WILLIAM E. SCHUYLER, JR.
Commissioner of Patents